Figure 1:
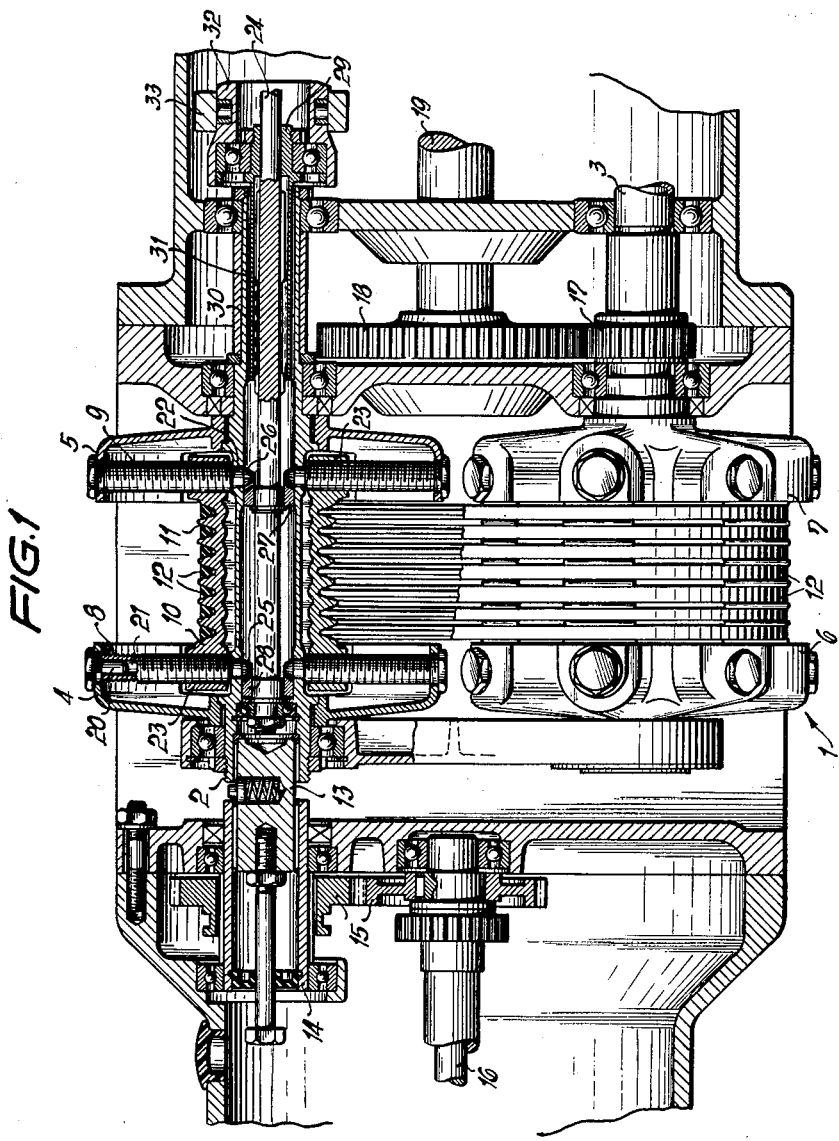

June 5, 1962 H. HOENICK ET AL 3,037,395
BELT TRANSMISSION
Filed May 10, 1960 2 Sheets-Sheet 1

INVENTORS
Hans HOENICK
Erich STOTZ
BY Dicke, Craig & Freudenberg
ATTORNEYS

INVENTORS
Hans HOENICK
Erich STOTZ

United States Patent Office 3,037,395
Patented June 5, 1962

1

3,037,395
BELT TRANSMISSION
Hans Hoenick, Stuttgart-Zuffenhausen, and Erich Stotz, Rommelshausen, Germany, assignors to Firma Dr. Ing. h.c. F. Porsche KG, Stuttgart-Zuffenhausen, Germany
Filed May 10, 1960, Ser. No. 28,085
Claims priority, application Germany May 27, 1959
11 Claims. (Cl. 74—230.19)

The present invention relates to a continuously variable, i.e., steplessly adjustable V-belt transmission having input and output shafts at which belt-pulley disks are arranged carrying threaded spindles whereby the spindles effect the radial adjustment of a plurality of V-belt pulley sectors.

It is known already in the prior art to radially adjust, in a continuously variable manner, the sectors of a belt pulley of a transmission by means of threaded spindles. The drive for the adjusting spindles thereby takes place in the prior art devices by means of toothed racks extending outside the transmission shafts. One toothed rack is provided thereby for each sector of the transmission belt pulley so that relatively high manufacturing and assembly costs are involved. For purposes of covering the adjusting mechanism, additional structural parts are required in the prior art arrangements which increase the weight of the transmission exhorbitantly and thereby also increase the dimensions thereof. A transmission constructed according to the principles of the prior art therefore is totally unsuited for the installation and accommodation thereof in the vehicle. Additionally, the possibility of effectively adjusting the transmission by means of the numerous toothed racks is relatively slight and impractical.

These prior art disadvantages and shortcomings are obviated by the present invention by operatively connecting the threaded spindles with an adjusting shaft through bevel gears, which adjusting shaft is arranged coaxially to the transmission shaft. By the use of such an arrangement, it is possible to achieve a construction in which, for each shaft of the transmission, only one adjusting mechanism for the threaded spindles thereof is required. Such an arrangement permits an optimum reduction of the diameter of the belt pulley which corresponds essentially to that of the transmission shaft. A particularly advantageous construction results if the adjusting shaft is accommodated within the transmission shaft constructed as hollow shaft. All of the threaded spindles belonging to the same belt pulley are thereby actuated in unison from a common bevel gear secured or arranged at the adjusting shaft so that the cost in gear wheels is considerably and significantly reduced. The actuation of the adjusting shaft takes place by means of a sleeve supported on a shaft which is slidably guided within a hollow shaft by means of a splined connection and is operatively connected with the adjusting shaft over a threaded connection. The sleeve is provided with a sliding bearing which in turn is operatively connected by means of a shifting fork with the actuating shaft.

The adjusting shafts for the drive and driven shafts of the transmission are operatively connected with a common actuating shaft assembly whereby the thread of the sleeve for the drive shaft has an opposite screw as compared to the thread of the sleeve for the driven shaft. The use of such an arrangement entails not only a simple and simultaneous actuation of the adjusting shafts, but also an oppositely directed change of the diameter of the belt pulleys so that with an actuation of the sleeves by means of the adjusting shaft in the sense of an effective increase in the diameter of the belt pulley of the drive shaft a continuous, effective reduction in the diameter of the belt pulley of the driven shaft takes place simultaneously.

Accordingly, it is an object of the present invention to provide an adjusting mechanism for a V-belt transmission which obviates the disadvantages and shortcomings of the prior art devices and which is simple in construction, reliable in operation and extremely effective without excessively large parts.

Another object of the present invention is the provision of a simple actuating mechanism for adjusting the transmission ratio of a V-belt transmission which may be readily accommodated within the normal contours of a transmission and which is extremely simple in the actuation and handling thereof by requiring only a minimum of parts.

A further object of the present invention is the provision of a V-belt transmission having an adjusting mechanism which significantly reduces the total number of parts and therewith not only the weight of the transmission but also the external dimensions thereof.

Still another object of the present invention resides in the provision of an adjusting mechanism for varying the transmission ratio of a V-belt transmission for vehicles in a continuously variable, stepless manner which is so arranged and constructed as to simultaneously vary the effective radial dimension of the belt pulley arranged on the drive shaft and of the belt pulley arranged on the driven shaft thereof in opposite directions.

Figure 2:
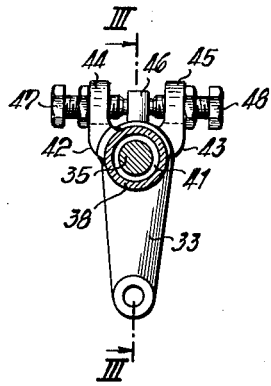
Figure 3:
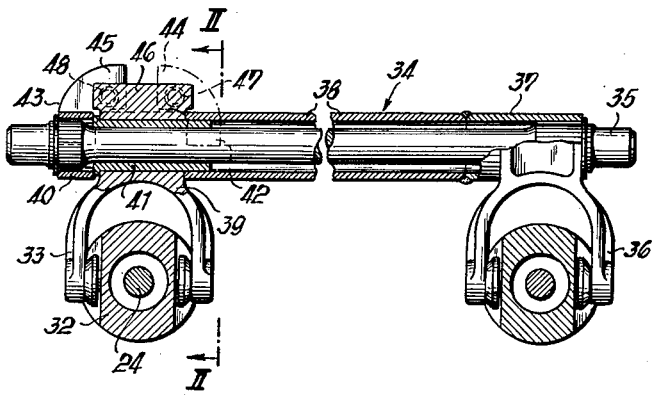

These and other objects, features and advantages of the present invention will become more obvious from the following description, when taken in connection with the accompanying drawing, which shows, for purposes of illustration only, one embodiment in accordance with the present invention and wherein FIGURE 1 is a horizontal cross-sectional view through a V-belt transmission in accordance with the present invention for a tractor, FIGURE 2 is a cross-sectional view through a part of the adjusting mechanism in accordance with the present invention taken along line II—II of FIGURE 3, and FIGURE 3 is a cross-sectional view taken along line III—III of FIGURE 2.

Referring now to the drawing wherein like reference numerals are used throughout the various views to designate corresponding parts, the V-belt transmission generally designated by reference numeral 1 consists essentially of a drive shaft 2, of a driven shaft 3, of two disk-like members 4, 5 and 6, 7 each arranged on a respective shaft, and of a plurality of threaded spindles 8 and 9 secured within the corresponding disks and carrying the belt pulley sectors 10. Each of the sectors 10 is provided with a plurality of V-belt grooves 11 for accommodating therein the V-belts 12 extending between the input and output shafts 2 and 3 of a transmission.

The drive shaft 2 of the transmission is operatively connected by means of a disengageable clutch 13 with a shaft 14 which in turn is operatively connected by means of meshing gears 15 with a shaft 16 constituting the transmission input shaft and driven from a suitable prime mover such as an internal combustion engine (not shown) over a clutch of any suitable construction (not shown).

The driven shaft 3 of the V-belt transmission is provided with a gear 17 which is in meshing engagement with a further gear 18 which in turn is secured to the output shaft 19 driving a differential gear of suitable construction (not illustrated).

The spindles 8 and 9 are retained in the disks 4 and 5 by means of pins 20 which are suitably anchored or threadably secured in the disks 4 and 5 and engage in corresponding bores 21 of the spindles 8 and 9. The spindles 8 and 9 are additionally rotatably supported in the transmission drive shaft 2 by means of pin portions 22 thereof which may be formed integrally therewith.

The sectors 10 are provided at the ends thereof with internally threaded bores 23 through which extend the externally threaded spindles 8 and 9. The bores 23, as well as the spindles 8 and 9, are provided with threads, preferably trapezoidal steep threads so that a radial adjustment of the sectors 10 is possible by rotating the threaded spindles 8 and 9.

The drive of the threaded spindles 8 and 9 takes place by means of an adjusting shaft 24 which is supported in the drive shaft 2 constructed as a hollow shaft. Each threaded spindle 8 and 9 includes for that purpose bevel gears 25 and 26, respectively, as extension of the pin portions 22 thereof, which are in meshing engagement with annular gears 27 and 28, respectively, having a suitably toothed configuration for meshing with the bevel gears 25 and 26. The annular gears 27 and 28 are securely connected for common rotation with the shaft 24 whereby exclusively a single annular gear 28 and 27 is provided for all of the threaded spindles of a respective disk 4 and 5.

A sleeve 29 is arranged at the adjusting shaft 24 outside the region of the V-belt transmission which sleeve 29 is operatively connected with the adjusting shaft 24 by means of a threaded connection, preferably a trapezoidal steep thread 30, and with the drive shaft 2 by means of a splined connection 31. A sliding bearing 32 is arranged at the sleeve 29 for common axial movement therewith which is operatively connected by means of a shifting fork 33 with an actuating shaft assembly generally designated by reference numeral 34.

The actuating mechanisms for the threaded bolts 8 and 9 of both transmission shafts 2 and 3 are basically of identical construction. There exists only one single difference, and more particularly the adjusting threads operatively connecting the sleeves 29 with the shafts 24 have opposite threads. For example, if the thread of the sleeve 29 of the actuating mechanism for the drive shaft 2 is a right-handed thread, then a left-handed thread is provided in the adjusting mechanism for the driven shaft 3 of the transmission.

The actuating shaft asembly 34 is constructed as a hollow shaft and supported on a support shaft 35, which, in turn, is suitably supported within the housing of the transmission (FIGURE 3) and is adapted to be selectively actuated. The actuating shaft assembly 34 is constructed of several parts and is composed essentially of a part 37 carrying the shifting fork 36 of the mechanism of the driven shaft 3, of a tubular spacer member 38, of a part 39 supporting the shifting fork 33 and of a sleeve 40. The part 37, together with the fork 36 is constructed as a unitary cast member and is securely connected for common rotation with the supporting shaft 35, for example, by a splined connection. The tubular spacer member 38 is secured to the part 37 by means of welding so that the parts 37 and 38 form a rigid unit. The sleeve 40 is also securely connected for common rotation with the supporting shaft 35 by means of a splined connection and forms an abutment for the part 39 accommodated between the sleeve 40 and the tubular spacer member 38. This part 39 of the actuating shaft assembly 34 is freely rotatably supported by means of a bearing bushing 41 at the support shaft 35.

The part 39 is operatively connected by means of a detachable securing means with the sleeve 40 and with the tubular spacer member 38. The securing means consists essentially of two brackets 42 and 43 arranged at oppositely disposed longitudinal end sides of the sleeve 40 and of tubular member 38 which brackets 42 and 43 are provided within the region of the actuating shaft part 39 with projections 44 and 45. Additionally, the part 39 of the actuating shaft assembly 34 is provided with an abutment member 46 which is disposed between the projections 44 and 45 and is adapted to be secured therebetween by means of bolts 47 and 48 secured in the projections 45 and 46.

If the actuating shaft assembly 34, and more particularly the shaft 35 thereof is rotated either manually or by means of any suitable mechanism that may include a suitable power assist, then with the abutment member 46 of the part 39 secured in place by bolts 47 and 48, the sliding sleeve 29 is axially displaced by means of the shifting fork 33 and the sliding bearing 32. The axial movement of the sleeve 29 is converted into rotary movement of the shaft 24 by means of the steep thread 30 which operatively connects the sliding sleeve 29 with the shaft 24. This rotary movement of the shaft 24 is transmitted over the meshing bevel gear pairs 25, 27 and 26, 28 to the threaded spindles 8 and 9 which effect a radial adjustment of the belt-pulley sectors 10. The operation described hereinabove of the adjustment for the drive shaft 2 also takes place simultaneously for the driven shaft 3 with oppositely directed radial movements of the sectors 10 thereof.

If one or several V-belts 12 of the transmission are to be removed, then the V-belt transmission has to be adjusted in such a manner that the sectors 10 of each transmission shaft 2 and 3 assumes the smallest radial position thereof. For that purpose, the adjusting mechanism is actuated in such a manner that the sectors 10 of the drive shaft 2 of the V-belt transmission assumes the smallest diameter as illustrated in the drawing. Subsequent thereto, the adjusting bolts 47 and 48 are removed and the actuating shaft 34 is again actuated to adjust sectors 10 of driven shaft 3 to the smallest radial position thereof. Only the adjusting mechanism for the driven shaft 3 is thereby actuated by means of the actuating shaft assembly 34 whereby the sectors 10 of the driven shaft 3 are adjusted to the smallest diametric positions thereof. The sectors 10 of the drive shaft 2 thereby remain in the previously established smallest radial positions thereof since the connection between the actuating shaft assembly 34 and the part 39 has been interrupted by removal of bolts 47 and 48. As a result thereof, it is rendered possible to slip off the V-belts which operatively connect the drive shaft 2 with the driven shaft 3 in an easy manner from the respective shafts.

While we have shown and described one embodiment in accordance with the present invention, it is understood that the same is not limited thereto, but is susceptible of many changes and modifications within the spirit and scope of the present invention, and we, therefore, do not wish to be limited to the details shown and described herein, but intend to cover all such changes and modifications as are encompassed by the scope of the appended claims.

We claim:

1. A continuously variable belt transmission having input shaft means, output shaft means, and belt transmission means operatively connecting said input shaft means with said output shaft means including radially adjustable belt pulley sector means, threaded spindle means operatively connecting said sector means with a respective shaft means for adjusting the radial position of the sector means, and means including adjusting shaft means arranged coaxially to the respective input and output shaft means and meshing gear means for adjusting said threaded spindle means to thereby vary the radial position of said sector means, sleeve means arranged coaxially with said respective input and output shaft means, spline means connecting said sleeve means to said respective input and output shaft means, and threaded means connecting said sleeve means to respective adjusting shaft means, said gear means being bevel gears, said bevel gears including two bevel gears on said adjusting shaft, and a plurality of bevel gears carried by said input and output shaft means, said two bevel gears being in mash with bevel gears of said plurality.

2. A continuously variable belt transmission having input shaft means, output shaft means, and belt transmission means operatively connecting said input shaft means with said output shaft means including radially adjustable belt pulley sector means, threaded spindle means operatively connecting said sector means with a respective shaft means for adjusting the radial position of the sector means, and means including adjusting shaft means arranged coaxially to the respective input and output shaft means and meshing gear means for adjusting said threaded spindle means to thereby vary the radial position of said sector means, sleeve means arranged coaxially with said respective input and output shaft means, spline means connecting said sleeve means to said respective input and output shaft means, and threaded means connecting said sleeve means to respective adjusting shaft means, slidable bearing means for each said sleeve means, actuating shaft means comprising an actuating shaft, and shifting fork means operatively connecting said slidable bearing means with different portions of said actuating shaft.

3. A continuously variable belt transmission having input means, output means, and V-belt transmission means operatively connecting said input means with said output means, comprising a plurality of V-belt sectors, disk means secured to a respective one of said input and output means, threaded spindle means rotatably supported in said disk means and threadably connected with said sectors for adjusting the radial positions thereof, and means including an adjusting shaft arranged coaxially to the respective input and output means and including bevel gear means for rotatably adjusting said threaded spindles, actuating means adapted to be rotated for adjustment thereof, means including a slidable bearing member surrounding each said adjusting shaft for operatively connecting said actuating means with said adjusting shaft means to rotate said threaded spindle means upon rotation of said actuating means, said actuating means comprising a rotatable shaft, and operative connections between opposite end portions of said rotatable shaft and each said slidable bearing member.

4. A continuously variable belt transmission having input shaft means, output shaft means, and belt transmission means operatively connecting said input shaft means with said output shaft means including radially adjustable belt pulley sector means, threaded spindle means operatively connecting said sector means with a respective shaft means for adjusting the radial position of the sector means, and means including adjusting shaft means arranged coaxially to the respective input and output shaft means and mashing gear means for adjusting said threaded spindle means to thereby vary the radial position of said sector means, sleeve means arranged coaxially with said respective input and output shaft means, spline means connecting said sleeve means to said respective input and output shaft means, and threaded means connecting said sleeve means to respective adjusting shaft means, common actuating means for the adjusting shaft means of said input shaft means and of said output shaft means including readily disengageable means for rendering ineffective the operative connection between said actuating means and one of said adjusting means to enable adjustment of the other adjusting means independently of said one adjusting means so as to enable adjustment of said sector means to the minimum radial position thereof and therewith enable ready exchange of the transmission belts.

5. A continuously variable belt transmission having input shaft means, output shaft means, and belt transmission means operatively connecting said input shaft means with said output shaft means including radially adjustable belt pulley sector means, threaded spindle means operatively connecting said sector means with a respective shaft means for adjusting the radial position of the sector means, and means including adjusting shaft means arranged coaxially to the respective input and output shaft means and meshing gear means for adjusting said threaded spindle means to thereby vary the radial position of said sector means, sleeve means arranged coaxially with said respective input and output shaft means, spline means connecting said sleeve means to said respective input and output shaft means, and threaded means connecting said sleeve means to respective adjusting shaft means, common rotatable actuating shaft means operatively connected with the adjusting shaft means for said input shaft means and for said output shaft means, said actuating shaft means being disposed transversely of said input shaft means and said output shaft means.

6. A continuously variable belt transmission having input shaft means, output shaft means, and belt transmission means operatively connecting said input shaft means with said output shaft means including radially adjustable belt pulley sector means, threaded spindle means operatively connecting said sector means with a respective shaft means for adjusting the radial position of the sector means, and means including adjusting shaft means arranged coaxially to the respective input and output shaft means and meshing gear means for adjusting said threaded spindle means to thereby vary the radial position of said sector means, sleeve means arranged coaxially with said respective input and output shaft means, spline means connecting said sleeve means to said respective input and output shaft means, and threaded means connecting said sleeve means to respective adjusting shaft means, said threaded means connecting said sleeve means to respective adjusting shaft means being of opposite hand so as to increase the radial position of one of said sector means while simultaneously therewith decreasing the radial position of the other sector means.

7. A continuously variable belt transmission according to claim 2, wherein the adjusting shaft means for said input shaft means and for said output shaft means are operatively connected with said actuating shaft means.

8. A continuously variable belt transmission according to claim 7, wherein the threaded connection operatively connecting said sleeve means with said adjusting shaft means is of opposite hand with respect to the thread operatively connecting the sleeve means for the output shaft means.

9. A continuously variable belt transmission according to claim 3, wherein said connecting means includes, means for converting the rotary movement of said actuating means into axial movement of said slidable bearing member, and means for converting the axial movement of said slidable bearing member into rotary movement of said adjusting shaft means.

10. A continuously variable belt transmission according to claim 3, wherein said operative connection include shifting fork means.

11. A continuously variable belt transmission having input means, output means, and V-belt transmission means operatively connecting said input means with said output means, comprising a plurality of V-belt sectors, disk means operatively connected with a respective one of said input and output means, threaded spindle means rotatably supported in said disk means and threadably connected with said sectors for adjusting the radial positions thereof, and means including an adjusting shaft arranged coaxially to the respective input and output means and including bevel gear means for rotatably adjusting said threaded spindles, actuating means adapted to be rotated for adjustment thereof, means operatively connecting said actuating means with said adjusting shaft means to rotate said threaded spindle means upon rotation of said actuating means, said connecting means including an axially displaceable member, means for converting the rotary movement of said actuating means into axial movement of said axially displaceable member, and means for converting the axial movement of said axially displaceable member into rotary movement of said adjusting shaft means, said actuating means including a supporting shaft, first means operatively connected with said supporting shaft for common rotation therewith and including shifting fork means for converting the rotary movement of said supporting shaft into axial movement of one of said axially displaceable members, second means operatively connected with said supporting shaft for common rotation therewith, third means rotatably supported on said supporting shaft and including shifting fork means for converting the rotary movement thereof into axial movement of the other axially displaceable member, and disengageable connecting means operatively connecting said first and second means with said third means to assure rotation in unison of said first, second and third means.

References Cited in the file of this patent

UNITED STATES PATENTS

| | | |
|---|---|---|
| 664,996 | Everett | Jan. 1, 1901 |
| 1,069,227 | Church-Smith | Aug. 5, 1913 |
| 1,776,339 | Siqueland | Sept. 23, 1930 |
| 2,110,033 | Bostick | Mar. 1, 1938 |
| 2,883,144 | Kendig | Apr. 21, 1959 |

FOREIGN PATENTS

| | | |
|---|---|---|
| 378,252 | France | Sept. 28, 1907 |